Feb. 12, 1924.
H. A. BOUSCHOR
CONNECTING MEANS FOR LINES
Filed Dec. 29, 1922
1,483,274
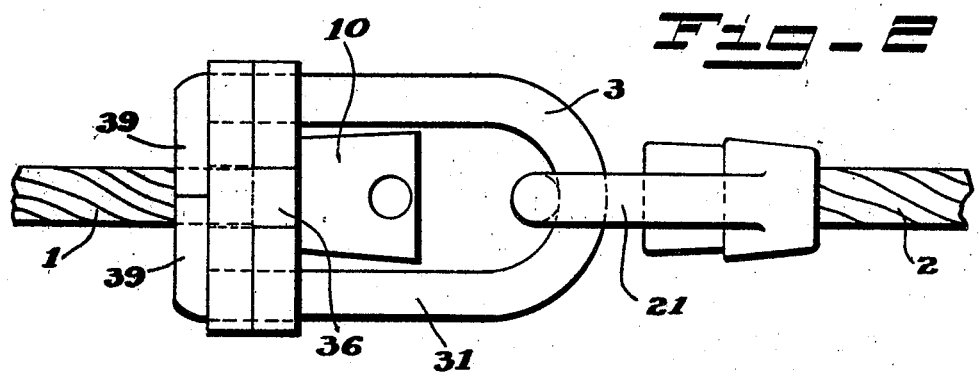
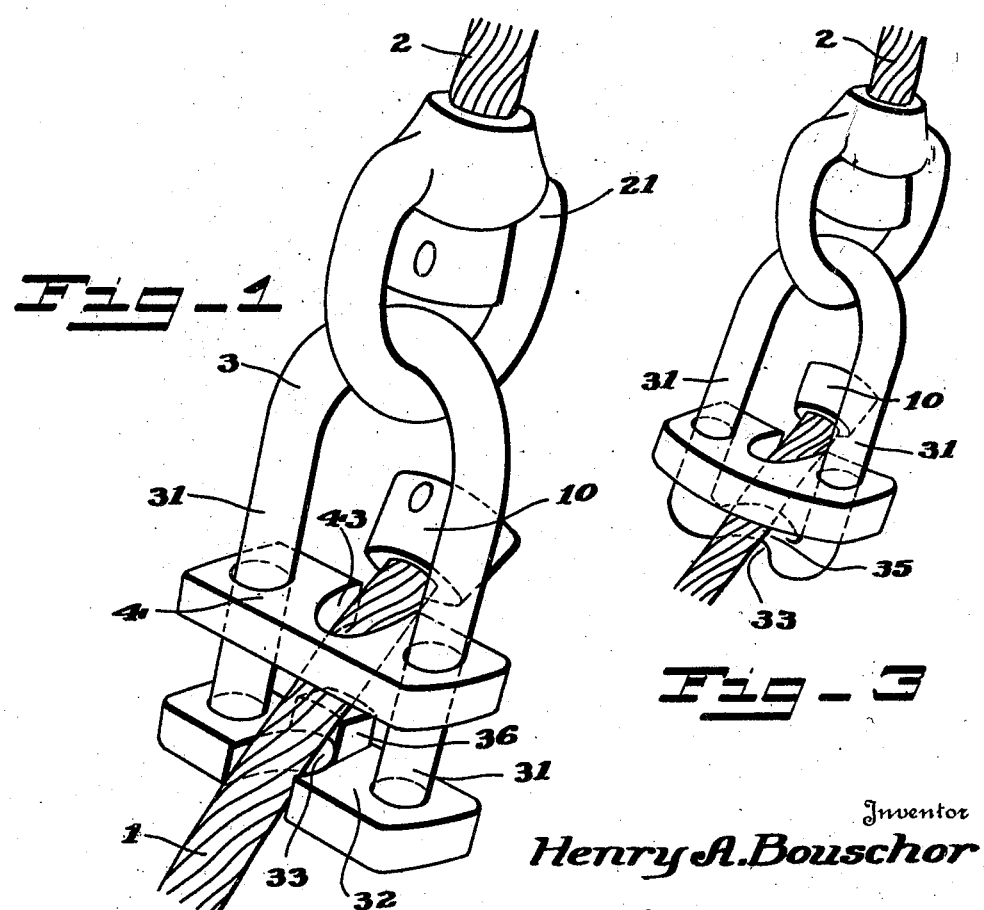
Inventor
Henry A. Bouschor
By H.L. & C.L. Reynolds
Attorneys Patented Feb. 12, 1924.

1,483,274

UNITED STATES PATENT OFFICE.

HENRY A. BOUSCHOR, OF VICTORIA, BRITISH COLUMBIA, CANADA, ASSIGNOR OF ONE-HALF TO WILLIAM E. BOUSCHOR, OF SEATTLE, WASHINGTON.

CONNECTING MEANS FOR LINES.

Application filed December 29, 1922. Serial No. 609,732.

*To all whom it may concern:*

Be it known that I, HENRY A. BOUSCHOR, a citizen of the United States of America, and resident of the city of Victoria, in British Columbia, Dominion of Canada, have invented certain new and useful Improvements in Connecting Means for Lines, of which the following is a specification.

My invention relates to means for connecting two lines together, as for instance, for connecting a choker to a butt line in logging operations. My invention is particularly intended to take the place of various kinds of safety butt hooks, which generally employ a spring latch, and which become useless by reason of dirt getting into the space behind the latch and thus preventing its operation.

The principal object of my invention is to provide a connection for lines which shall be simple both to make and to operate, which shall hold the two lines together securely, whether under tension or slackened, and yet in a manner which permits their easy and quick disengagement.

A further object is the provision of a connection which shall serve the purpose both of a hook and of a swivel.

My invention comprises those novel parts and combinations thereof which are shown in the accompanying drawings, described in the specification and particularly defined by the claims terminating the same.

In the accompanying drawings my invention is shown in the form which is now preferred by me.

Figure 1 is a perspective showing my invention, the parts being in the position assumed when nearly but not quite engaged.

Figure 2 is an elevation of my invention, parts being shown in the connected position.

Figure 3 is a perspective similar to Figure 1 of a modified construction.

The two lines which it is desired to connect are represented by the numerals 1 and 2, respectively, of which 1 may be the choker line and 2 the butt line. The choker line should not have a large or bulky member attached to it other than the choker hook, and for that reason I have shown at its end only a terminal knob 10, which is secured to the line in any suitable manner and is of any desired form. To the butt line 2, however, I connect a link 3. This may be connected directly to the butt line, or preferably, as shown in the drawings, through a swivel link 21.

The link 3 is completely closed, although its lower end may be formed of material other than that which forms its side bars 31. I have shown in the preferred construction a cross bar 32 forming the connection between the two side bars 31 of the link at its bottom, the ends 39 of the side bars being bent over to retain and support the cross bar 32. This cross bar 32 is preferably secured directly to the lower ends of the two side bars 31, although it may be held against removal therefrom and be slidable thereon. It has a side opening notch 33, which notch preferably has its center alined with the centers of the side bars 31. In the form shown in Figure 3 the link is an ordinary closed link except that its lower end, instead of being rounded in the same plane as the link, is bent to one side, and the curve of the lower end 35 of the link thus forms the side opening notch 33.

In whatever manner the link 3 is formed it has, slidable upon its side bars 31, a cross bar 4 which is guided for sliding movement upon the bars 31 of the link and which has a side opening notch 43 which is registrable with the notch 33. Each of these notches 33 and 43 forms a line-receiving channel, the two together when in registry forming a completely enclosed line-receiving aperture.

In order to connect the lines 1 and 2 the cross bars 4 and 32 are separated, as by sliding the cross bar 4 upward along the side bars 31. The knob 10 of the line 1 is then inserted between the cross bars 4 and 32 and between the side bars 31. The line is engaged in both notches 33 and 43 and brought into approximate parallelism with the side bars 31, with the knob 10 bearing upon the back or upper side of the cross bar 4. Any pull on the line 1, or its own weight, will cause the cross bar 4 to drop into engagement with the cross bar 32, or in the form shown in Figure 4, into contact with the bent lower portion 35 of the link, and the line-receiving aperture is thus completed. So long as tension is maintained on the line 1 it will be impossible to separate the bars 4 and 32, or 4 and 35, as the case may be, and unless they are separated it is impossible to remove the line 1. When it is desired to remove the line, however, tension in the line 1 is released, the bar 4 moved upward, and the knob 10 removed from between the bars 4 and 32 or 4 and 35 and from between the side bars 31.

It may be desirable to provide a plane bearing surface entirely surrounding the notch 43, and for this purpose I have provided an upwardly extending lug 36 on the cross bar 32, which lug extends upward into the notch 43 when the cross bar 4 is in its lower position. The lug 36 completely fills all of the notch 43 not occupied by the line 1, and rises high enough to permit the base of the knob 10 to rest thereupon and at the same time to rest upon the back or upper surface of the cross bar 4.

What I claim as my invention is:

1. A connecting means for lines comprising a link secured to one line and having one end provided with a side-opening notch adapted to receive the other line, and a keeper bar slidable upon the side bars of the link and having a side opening notch complemental to the notch in the link to form therewith an enclosed line-receiving aperture, the line which is to be secured thereby having a terminal knob adapted to be passed between the side bars of the link and between said keeper bar and the notched end of the link.

2. A connecting means for lines comprising a link secured to one line and having transversely extending bars provided with complemental line-receiving notches for the reception of the other line, said bars being relatively movable lengthwise of the link, the other line having a knob secured to its end and adapted to be passed between said bars and between the sides of the link.

3. A connecting means for lines comprising two cross bars each having a side-opening line-receiving notch therein, said notches being registrable to form an enclosed line-receiving aperture, guides secured to one bar and having guiding engagement with the second bar, said guides being connected to one line, and the other line passing through said aperture-forming notches, and a terminal knob on said line engageable with the back side of the slidable bar to prevent separation of said bars.

4. A connecting means for lines comprising two cross bars each having a side-opening line-receiving notch therein, said notches being registrable to form an enclosed line-receiving aperture, guides secured to one bar and having guiding engagement with the second bar, said guides being connected to one line, and the other line passing through said aperture-forming notches, a terminal knob on said line engageable with the back side of the slidable bar to prevent separation of said bars, and a lug upon said first bar projecting towards the slidable bar to fill the unoccupied portion of the line-receiving notch therein when the two bars are brought together.

Signed at Victoria, British Columbia, Canada, this 18 day of December, 1922.

HENRY A. BOUSCHOR.